United States Patent
Stern et al.

(10) Patent No.: US 7,797,335 B2
(45) Date of Patent: Sep. 14, 2010

(54) CREATION AND PERSISTENCE OF ACTION METADATA

(75) Inventors: Edith H. Stern, Yorktown Heights, NY (US); John J. Thomas, Wappingers Falls, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 11/624,378

(22) Filed: Jan. 18, 2007

(65) Prior Publication Data

US 2008/0177755 A1 Jul. 24, 2008

(51) Int. Cl.
G06F 17/30 (2006.01)
G06F 7/00 (2006.01)

(52) U.S. Cl. .................. 707/770; 707/713; 707/756; 707/803; 726/25

(58) Field of Classification Search .................. None
See application file for complete search history.

(56) References Cited

U.S. PATENT DOCUMENTS

| | | | |
|---|---|---|---|
| 6,480,836 B1 * | 11/2002 | Colby et al. .................. 707/3 |
| 6,868,424 B2 | 3/2005 | Jones et al. |
| 6,973,466 B2 | 12/2005 | Kaler et al. |
| 7,171,618 B2 * | 1/2007 | Harrington et al. .......... 715/229 |
| 2003/0033280 A1 * | 2/2003 | Van Den Hamer et al. ...... 707/1 |
| 2004/0193952 A1 | 9/2004 | Narayanan et al. |
| 2004/0236769 A1 | 11/2004 | Smith et al. |
| 2005/0193250 A1 | 9/2005 | Takeuchi et al. |
| 2005/0210026 A1 | 9/2005 | Wood |
| 2007/0100905 A1 * | 5/2007 | Masters et al. ............... 707/201 |
| 2007/0244877 A1 * | 10/2007 | Kempka ......................... 707/5 |

* cited by examiner

*Primary Examiner*—Greta L Robinson
*Assistant Examiner*—James J Wilcox
(74) *Attorney, Agent, or Firm*—Stevens & Showalter LLP (57) ABSTRACT

File transitions are identified that are to be tracked and at least one element of metadata is generated that characterizes each identified file transition to be tracked. Upon receiving a request for historical transition information, elements of metadata corresponding to at least two instances of a tracked file are aggregated and information is provided responsive to the request that is derived from the aggregated elements of metadata. The action metadata may follow that history of each tracked file as well as the histories of copies of each tracked file over time. Thus, an operator can manage the infrastructure of a corresponding computing environment with knowledge of the current and historical activities of files.

26 Claims, 9 Drawing Sheets

CREATION AND PERSISTENCE OF ACTION METADATA

BACKGROUND OF THE INVENTION

The present invention relates to systems, computer methods and computer program products for providing infrastructure management with knowledge of current and historical file status.

Computer system file management can be a time consuming and arduous task. For example, a computer operator may attempt to realize increased available storage space on a computer system through the removal of unnecessary files. However, prior to initiating the file management operation, the computer operator may be totally unaware of the existence of certain files located on a corresponding storage device. Moreover, the operator may be unable to ascertain whether an identified file is necessary because the operator has no way to determine where the file came from, what the file does, where the file originated and what programs created and/or use the file.

Still further, a computer operator may want to determine whether a given program is intended to perform harmful activities on the computer system. For example, malware, such as spyware, viruses, worms, Trojan horses and other malicious software, constitute growing problems for computers, especially those connected to the Internet or that are otherwise exposed to external sources of files. Moreover, the use of malware for nefarious activities directed to crime and theft is increasing in frequency relative to malware that causes annoyance, slowdowns and other forms of disruption, but are otherwise nondestructive.

The above problems may be increased by the interaction of systems, processing devices and operators, such as may be encountered in a typical enterprise setting. For example, a malicious file received by a computer connected to the enterprise may spread internally in such a manner that harm is inflicted onto other computers within the enterprise. Even if a malicious file is detected before it is transmitted to every computer within the enterprise, a proactive enterprise security policy may impose remediation on a number of computers, resulting in reduced productivity and general aggravation to the system operators of the enterprise.

BRIEF SUMMARY OF THE INVENTION

According to an aspect of the present invention, a computer-implemented method for tracking files comprises identifying file transitions that are to be tracked, generating at least one element of metadata that characterizes each identified file transition to be tracked, receiving a request for historical file transition information, aggregating elements of metadata corresponding to at least two instances of a tracked file that is associated with the request for historical information and providing responsive to the request, information derived from the aggregated elements of metadata.

According to another aspect of the present invention, a system to track file transitions comprises a module to identify file transitions that are to be tracked, a module to generate at least one element of metadata that characterizes each identified file transition to be tracked, a module to receive a request for historical file transition information, a module to aggregate elements of metadata corresponding to at least two instances of a tracked file that is associated with the request for historical information and a module to provide, responsive to the request, information derived from the aggregated elements of metadata.

According to yet another aspect of the present invention, a computer program product to track file transitions comprises a computer usable medium having computer usable program code embodied therewith, the computer usable program code comprising computer usable program code configured to identify file transitions that are to be tracked, computer usable program code configured to generate at least one element of metadata that characterizes each identified file transition to be tracked, computer usable program code configured to receive a request for historical file transition information, computer usable program code configured to aggregate elements of metadata corresponding to at least two instances of a tracked file that is associated with the request for historical information and computer usable program code configured to provide, responsive to the request, information derived from the aggregated elements of metadata.

DETAILED DESCRIPTION OF THE INVENTION

The various aspects of the present invention may be embodied as systems, computer implemented methods or computer program products. Also, various aspects of the present invention may take the form of an entirely hardware embodiment, an entirely software embodiment (including firmware, resident software, micro-code, etc.) or an embodiment combining software and hardware. Moreover, embodiments or aspects thereof, such as block(s) illustrated in the diagrams of the figures, may be generally referred to, either individually or collectively as a "circuit," "module" or "system." Furthermore, the various aspects of the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate or transport the program for use by or in connection with an instruction execution system of a corresponding processing device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, or semiconductor system, apparatus or device.

More specific examples of the computer usable or computer readable medium comprise for example, a swappable intermediate storage medium such as floppy drive, tape drive, external hard drive, a portable computer diskette, a hard disk, a random access memory (RAM), a read-only memory (ROM), an erasable programmable read-only memory (EPROM or Flash memory), a portable compact disc read-only memory (CD-ROM) or a digital video disk (DVD). The computer-usable or computer-readable medium may also comprise paper or another suitable medium upon which the program is printed, as the program can be electronically captured, for example, via optical scanning of the paper or other medium, then compiled, interpreted, or otherwise processed in a suitable manner, if necessary, and then stored in a computer memory.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Figure 1:
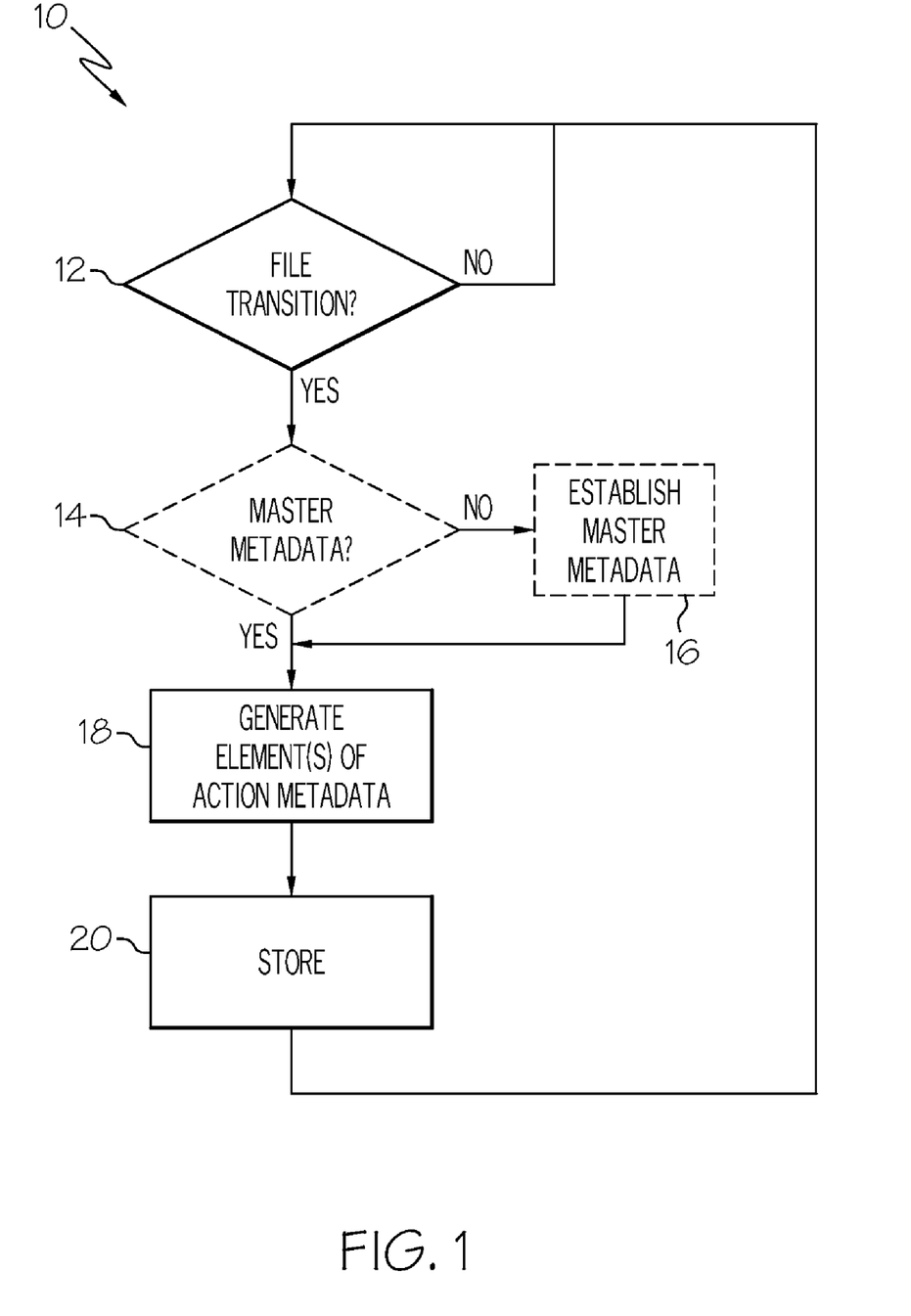
FIG. 1 is a diagram illustrating an exemplary system, computer implemented method and/or computer program product for the creation and persistence of action metadata.

Referring now to the drawings and particularly to FIG. 1, a diagram illustrates an exemplary system, computer implemented method and/or computer program product 10 for the creation and persistence of action metadata. Control remains at 12 until a file transition is identified. For example, the control block at 12 may comprise a module that identifies file transitions that are to be tracked. For example, activities may be actively monitored to detect predetermined transitions. As another example, indications of file transitions may be received at the control block 12, such as from one or more associated services, processes, clients, systems, etc. If a file transition is identified at 12, at least one element of action metadata that characterizes the identified transition is generated and recorded.

In an exemplary implementation, transition-related elements of metadata are stored as part of master metadata. A decision may be made at 14 as to whether or not associated master metadata has previously been created or otherwise initialized. If necessary, master metadata may be established at 16. In this exemplary implementation, master metadata corresponds to the accumulation of one or more action metadata elements, which may be recorded over time. For example, depending upon how the action metadata elements are to be stored, it may be necessary to set up one or more log files, databases, or other storage structures. Depending upon the manner in which the meta data elements are stored, it may be not be necessary to check for and setup master metadata at 14 and 16, thus these boxes are shown in phantom lines.

At least one element of action metadata that characterizes the identified file transition to be tracked is generated at 18. For example, the block at 18 may comprise a module that generates the metadata element(s) in the form of a database record, log entry, tuple, file header information, comment, embedded file code information or other suitable format, examples of which are described in greater detail herein. The element(s) of action metadata are utilized to update the appropriate master metadata and/or are otherwise stored at 20, and flow control returns back to 12 to wait for additional file transitions. Various exemplary methods of identifying, generating, storing, organizing and accessing action metadata are also described in greater detail herein.

In an exemplary implementation, a file transition to be tracked may comprise receiving, transmitting, transforming or rendering a file. Thus, as a few illustrative examples, one or more transitions may be identified, and corresponding action metadata elements may be generated, when uploading or downloading a file, e.g., from a file server; moving a file from one storage location to another storage location, such as from a first mail system user account to a second mail system user account or from a mail system to a file system, e.g., by detaching, downloading, copying or otherwise transferring the file from an attachment included with an e-mail message to a corresponding storage location on a storage device; or printing a file. Other exemplary transitions will be described in greater detail herein. Moreover, depending upon the particular implementation, transitions may be defined in other manners, e.g., to include specific types of actions that are desired to be tracked, recorded or otherwise monitored.

In general, the types of tracked files may be interpreted expansively to include any type of computer related file. For example, an implementation may monitor file transitions corresponding to structured and unstructured documents, images, digitally encoded audio, video and other multimedia, libraries, catalogs and other lists, collections of data, e.g., as stored in one or more units, software code, software objects, e-mail or other forms of electronic messages and other types of computer-readable information. Alternatively, transitions may be tracked for specific file types.

Further, file transitions may be tracked across all exposure channels of one or more systems. Alternatively file transitions may be tracked across specific exposure channels or one or more systems. For example, primary exposure to new files on a processing device may be derived from exposure channels derived from interaction with an electronic mail system and/or access to an external network such as the Internet. Accordingly, transitions may be recorded for e-mail messages and corresponding attachments, e.g., by monitoring transitions through an e-mail application, such as an e-mail client or e-mail server. As another example, transitions may be recorded for hypertext markup language documents and corresponding files that are downloaded, uploaded or otherwise delivered to a corresponding system, e.g., by monitoring transitions through a web browser or other suitable web-enabled application or through a web server. Still further, file transitions may be tracked across one or more systems that may reside in a single processing device such as a computer, e.g., via e-mail and Internet clients, or across one or more systems involving multiple processing devices, such as in a computer enterprise setting. Thus, in general, file transitions may be tracked across one or more hardware processing devices or one or more software processing devices, which may each be executed by the same or different hardware.

Figure 2:
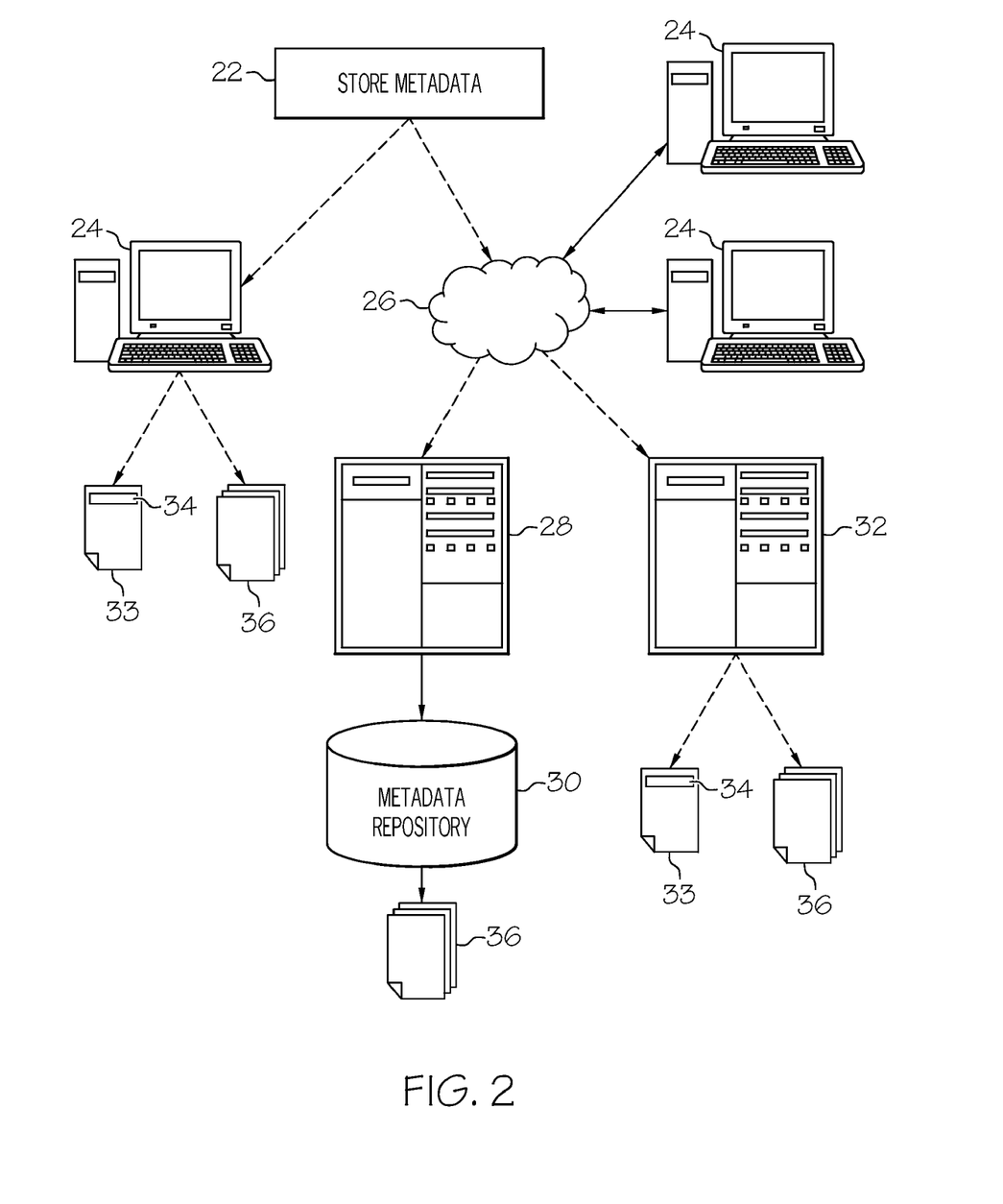
FIG. 2 is a block diagram illustrating several exemplary ways of storing action metadata.

Referring to FIG. 2, a block diagram illustrates several exemplary implementations for managing action metadata. One or more of these exemplary implementations may be used, for example, to update the master metadata at 20, as described with reference to FIG. 1. Action metadata is stored in an appropriate storage location at 22. The action metadata may be stored on a processing device 24 that is associated with the file corresponding to the tracked file transition. For example, the system, method and computer program product 10 can be implemented on a single processing device, e.g., on the user's personal computer.

Moreover, action metadata may be stored on a remote storage device, such as by communicating the action metadata across the network 26 to a processing device such as a server 28 that maintains a central metadata repository 30. The action metadata may also be communicated across the network 26 to a storage location at a remote processing device, such as represented by server 32, which may be used, for example, to aggregate or otherwise accumulate action metadata, such as at a central, corporate or other suitable remote location. For example, the action metadata may be transferred to a central server asynchronously via a connectionless network protocol.

Elements of action metadata may be combined with, e.g., appended to, integrated with, or otherwise written to a file 33 corresponding to the identified transition, thus defining intrinsic action metadata 34. For example, the elements of action metadata may be written into a header, tag, footer, or other designated metadata area of the file. The file 33 and corresponding action metadata elements may be stored locally, or on a remote processing device, e.g., on the server 32.

Alternatively, the generated elements of action metadata may be stored in conjunction with the file associated with the corresponding tracked file transition, thus defining extrinsic metadata 36. Under this arrangement, the elements of metadata may be stored independently of the associated file corresponding to the identified transition. For example, as FIG. 2 illustrates, the extrinsic metadata 36 may be stored on a user's personal computer or other processing device where the corresponding file resides, at the central metadata repository 36, on the remote server 32, etc.

Figure 3:
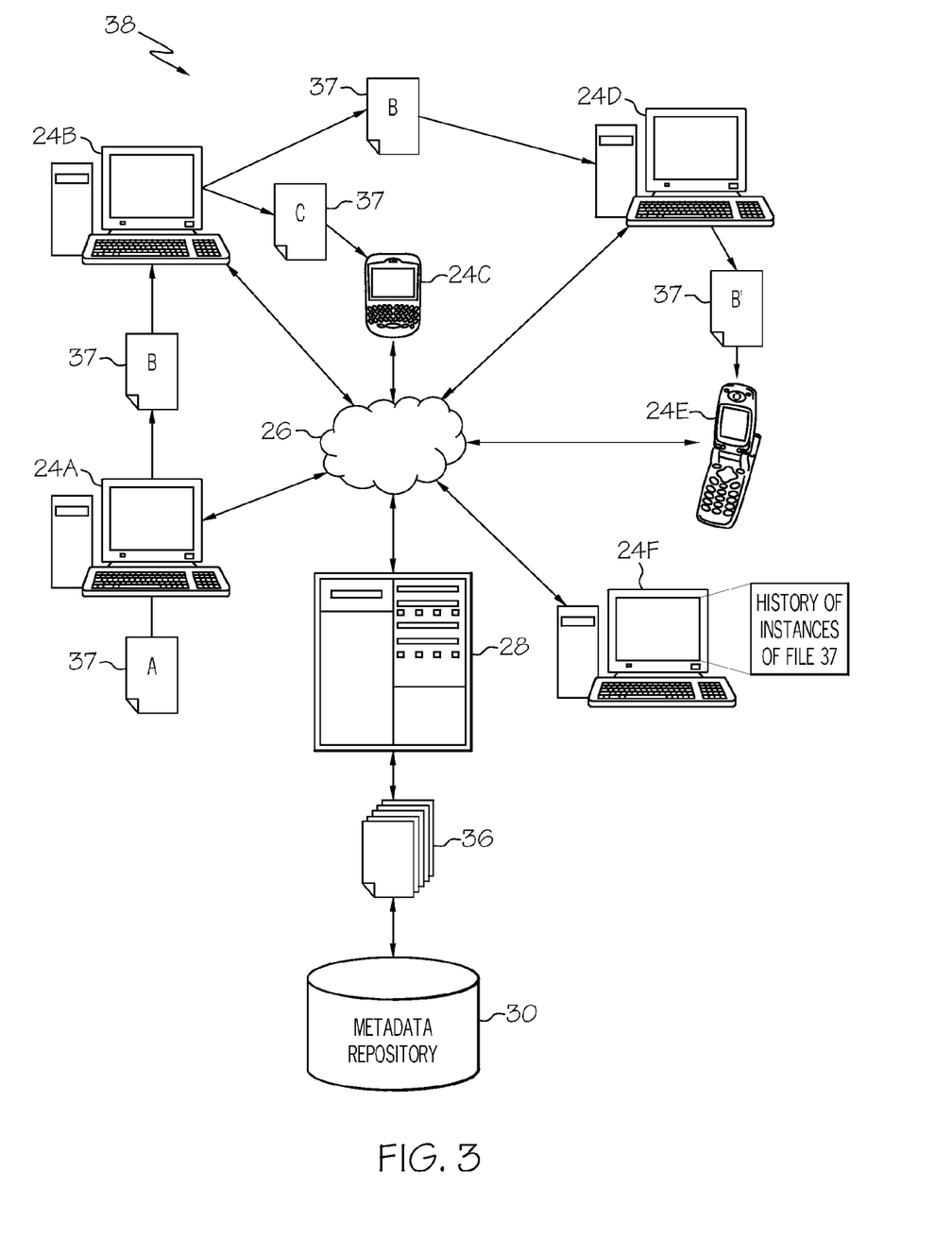
FIG. 3 is a block diagram illustrating a plurality of processing devices which may store action metadata in a metadata repository.

Referring to FIG. 3, an exemplary computer network is shown for purposes of illustrating a manner in which action metadata may be collected into a metadata repository 30 as described with reference to FIG. 2. As schematically illustrated, a plurality of processing devices 24A-F communicate across the network 26 with the server 28. Thus, the system may be supported by networking components that interconnect the hardware and/or software processing devices 24A-F, 28, including for example, routers, hubs, firewalls, network interfaces, wired or wireless communications links and corresponding interconnections. Moreover, the network may comprise connections using one or more intranets, extranets, local area networks (LAN), wide area networks (WAN), wireless networks (WIFI), the Internet, including the world wide web, and/or other arrangements for enabling communication between the processing devices 24, in either real time or otherwise, e.g., via time shifting, batch processing, etc.

Typical processing devices may include for example, servers, personal computers, notebook computers, transactional systems, appliance or pervasive computing devices such as a personal data assistant (PDA), palm computers, cellular access processing devices, gateways, special purpose computing devices and/or other hardware or software devices capable of supporting or otherwise being associated with files that have transitions that are tracked as set out in greater detail herein. In the example illustrated in FIG. 3, file transitions occurring with reference to each processing device 24A-F are aggregated via the server 28 to the central metadata repository 30. Thus, file transitions that relate to the same file, or copies of the same file, may be aggregated to a common source, even if the transitions are identified by, or are otherwise associated with more than one of the processing devices 24 and/or one or more users.

As an example, which is provided for purposes of illustration and not by way of limitation, assume that processing device 24A obtains a first instance of file 37, designated 37A. The file 37A may have been received via an e-mail attachment, an Internet download, installed from an external device such as a floppy, flash, USB, CD-ROM drive, etc. Upon receiving the file 37A, elements of action metadata 36 are stored in the action metadata repository 30. Since this is the first instance of this file, metadata elements 36 may include an identifier, date, time, origin or source of the file and/or other relevant information, associated user, medium of delivery, etc.

At some time, a second instance or copy 37B of the file 37A is provided to processing device 24B. When that transition is detected, action metadata elements 36 may be stored in the metadata repository 30 that identify, for example, an identifier that associates the file 37B as an instance of file 37A, the source of the file 24A, the destination of the file 24B, time, date and other suitable information. Processing device 24B may provide processing device 24C with a third instance or copy 37C of the file 37A. Thus, appropriate action metadata elements 36 are stored in the metadata repository 30 substantially as described above, e.g., by storing an identifier, source and destination, time date, etc. Then, assume that the second processing device 24B moves its copy 37B to processing device 24D. The transition is detected, and action metadata elements 36 are stored in the metadata repository identifying that the second instance or copy 37B is has been moved etc. Processing device 24D may alter the file 37B to a modified version 37B' and send that modified version to processing device 24E. Under this arrangement, action metadata elements 36 may include an identifier that identifies the file 37B' as a modified version of file 37B, and record the source, destination, date, time etc. of the file copy transition.

Now, assume that processing device 24F is interested in discovering the history of File 37 and its various instances across the enterprise 38. By interacting with the server 28 and metadata repository 30, e.g., by sending queries to the server 28, the processing device 27F can obtain a complete history of each instance of the file 37, track its origins, its versions, how quickly copies of the file 37 spread, how the file was spread, e.g., via email, bulk email, via file server downloads, and other types of relevant information. For example, the metadata elements corresponding to at least two instances of the file 37, e.g., instances 37A, 37B, 37B' and 37C can be aggregated and information derived from the aggregated metadata elements can be provided to the processing device 24F, e.g., in the form of a query response. While provided for purposes of illustration, the above example should not be construed as limiting. For example, any number of transition types may be monitored. Moreover, the data comprising each metadata element may be determined by the particular application. Still further, any number of queries may be run against the master metadata elements.

Figure 4:
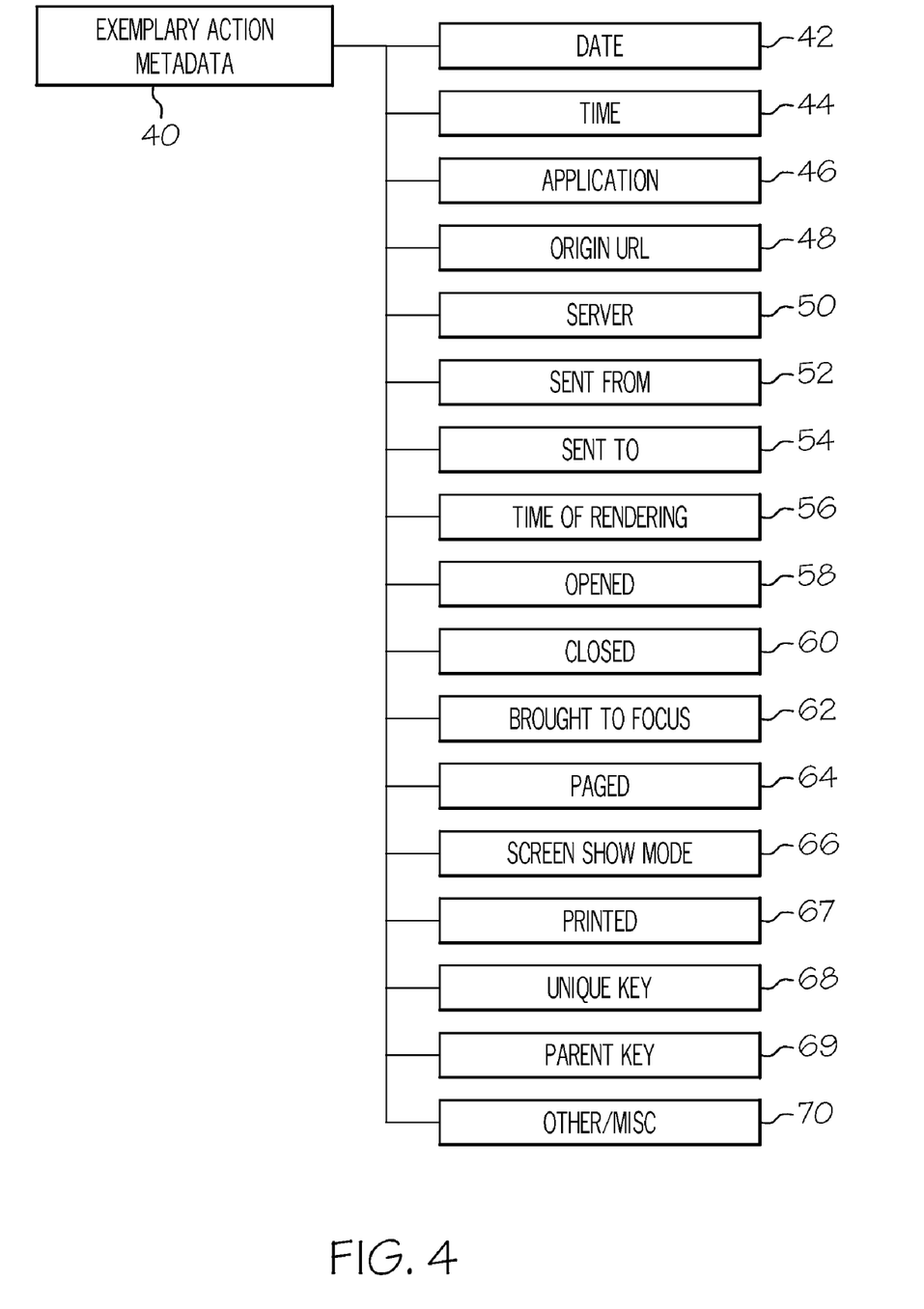
FIG. 4 is a chart illustrating exemplary optional elements of action metadata.

Referring to FIG. 4, a chart illustrates several exemplary elements of action metadata that may be utilized to characterize file transitions. As shown, the exemplary action metadata 40 may comprise one or more elements (attributes), such as a date of the identified transition 42; a time of the identified transition 44 and/or application information 46, such as the application involved in the identified file transition. Other exemplary attributes may comprise an origin URL 48, e.g., if the identified transition corresponds to a file download; server information 50, e.g., if the identified transition corresponds to an FTP transfer; sent-from information 52, such as may be defined by a sending party if the identified transition corresponds to a transmitted e-mail or other message and/or sent-to 54, such as may be defined by a recipient if the identified transition corresponds to a transmitted e-mail or other message.

If the transition corresponds to rendering a file, exemplary attributes may comprise time of rendering 56 as well as details relevant to the manner in which the file was rendered, such as when a file was opened 58; when a file was closed 60; when a file was brought to focus 62; when a file was paged 64; when a file was put into screen show mode 66; when a file was printed 67, etc. A further exemplary attribute may comprise a unique key 68 for each file, which may comprise, for example, a combination of filename and creation time or other information that is unique. Yet another exemplary attribute may comprise the key of the parent (source) file 69. If the present file is a copy of existing file, or a copy of a copy, etc., tracking the parent file of the file associated with the action metadata will allow a determination of the provenance, e.g., a history that enables a determination of the origination and/or chain of custody or transmission trail of the file copy. Still further, any other miscellaneous transitions may be defined by attribute 70.

The action metadata 40 may be stored in any suitable format including for example, one or more relational databases, non-relational databases, log files, audit files, arrays, linked lists or other suitable storage structures. In selecting the most appropriate format for the action metadata 40, the specific implementation may consider factors such whether an implementation can afford the computational expense of organizing the action metadata 40 into a structured record, such as a relational database record, at the time of metadata creation. For example, the computational overhead associated with maintaining an audit trail, log file or other format that is not highly structured may be relatively cheap compared to the computational cost required to create and store corresponding action metadata in a relational database record. However, the computational cost saved on the front end will likely be offset by additional processing burdens on the back-end when retrieving, sorting and processing the recorded action metadata. Correspondingly, action metadata that is stored in a relational database may have relatively higher computational cost at the time of storing the action metadata and correspondingly less computational cost during subsequent processing because the metadata information is already organized, e.g., sorted, indexed, keyed, etc.

Figure 5:
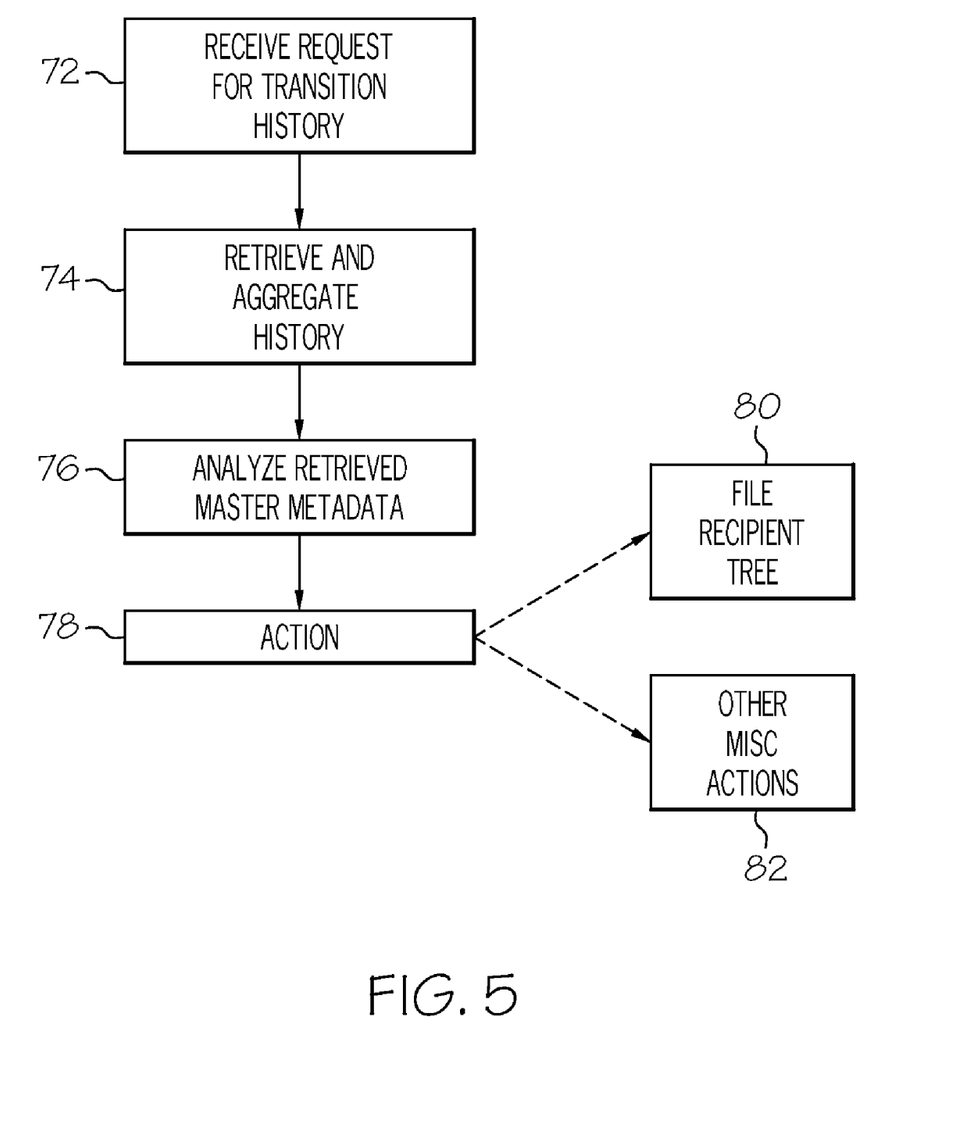
FIG. 5 is a diagram illustrating exemplary approaches for utilizing action metadata.

Referring to FIG. 5, a diagram illustrates an exemplary manner for using action metadata. Upon receiving a suitable request at 72 for a transition history, action metadata is retrieved at 74. Thus, as an example, the block at 72 may comprise a module that responds to requests for action metadata, including requests for transition history information, which may be implemented via programmatic requests, data mining applications, SQL queries, manually input via operator request, implementations as part of autonomous processing or otherwise derived from systems, services, processes, etc. The action metadata retrieved at 74 may comprise the complete master metadata, e.g., the entirety of the relevant collected action metadata, or a subset thereof. For example, action metadata may be retrieved that corresponds to transitions associated with a particular file, one or more instances or copies of a particular file, one or more file types, e.g., e-mail messages. Further illustrative examples include retrieving action metadata transitions recorded by one or more processing devices, transitions recorded by one or more users, associations or other groups of users, transitions recorded during a time/date range, transitions associated with a source of one or more files or any other transition history or portions thereof, e.g., as can be discerned from the attributes stored as part of the action metadata 40. Still further, depending upon how the metadata is stored, it may be necessary to aggregate or otherwise accumulate the metadata from one or more sources, e.g., log files etc. The retrieved action metadata may be analyzed at 76 and an appropriate action is taken at 78, e.g., based upon an analysis of retrieved action metadata.

Histories corresponding to action metadata may be aggregated, such as by aggregating action metadata within a single system or aggregating metadata across a department, information technology infrastructure, or other suitable physical or logical grouping of processing devices. For example, action metadata may be aggregated across a collection of IP addresses addressable on a network such as the Internet across all processing devices in an enterprise, across a homogeneous collection of systems, e.g., all processing devices corresponding to smartphones, etc., across a heterogeneous set of resources such as servers, personal computers, smartphones, etc. Further, where transition metadata comprises rendering information, it is also possible to track when and/or where files are printed, thus allowing, for example, a history of printouts to be generated.

Moreover, the analysis of action metadata at 76 may comprise preparing printouts, data files, tables, charts, graphs and other visual or logical metaphors that may be utilized to organize and or present the action metadata to the requester.

For example, an action at 78 may comprise creating a file recipient tree or other logical metaphor for organizing the retrieved metadata at 80. A file recipient tree may be used, for example, to provide insight for intelligently tracking the distribution of malware, or for otherwise determining how much attention a file has received. Moreover, a "life history" of the corresponding file may be reconstructed, that may include metadata elements aggregated across multiple processing devices. Thus, for example, if a file is determined to be malware, the extent of its spread on a network can be determined and the patterns of its distribution to a corporate network can be mapped, e.g., using the file recipient tree. This allows a remedy that is targeted only to those processing devices that are infected or otherwise contaminated by the malware, e.g., rather than causing a loss of productivity for all processing devices associated with the network. Moreover, the file recipient tree can be used for purposes other than taking action against malware. For example, the file recipient tree may be used to make sure an upgrade, revision, announcement or other information reaches the intended recipient users or target processing devices.

Certain viruses have the property that they are set to "sleep" on a system until a corresponding triggering event, e.g., a predetermined date/time. At the predetermined triggering event, the virus "wakes up" and performs its function, which is typically nefarious, e.g., by deleting, corrupting or modifying files on the associated system. Prior to the triggering event, such viruses spread by capturing e-mail addresses and propagating themselves to the list of members read from e-mail systems. However, using the action metadata 40, the propagation of a particular file corresponding to malware may be tracked and mapped thus allowing for the affected machines to be determined and the virus removed, potentially prior to the virus implementing its programmed function.

Thus, if a computer user was unaware of the vulnerability, the ability to understand the transmission history of the suspect file would allow a concerted effort to heal the infected machine before damage occurred due to the virus. Furthermore, in the event that some machines were infected within an enterprise, a list of the deleted files may be preserved in the metadata, thus easing the burden of rebuilding the contaminated and/or otherwise deleted files. For example, the action metadata 40 may be stored in a central repository 30 as described with reference to FIG. 2. Under this arrangement, a virus, hardware crash or other unexpected event may cause damage to an identified file or files on one or more processing device of a corresponding enterprise. However, the aggregated action metadata 40 collected at the central repository 30 may be analyzed to gain an understanding of other systems within the enterprise that are storing a copy or copies of the identified files, thus allowing uncorrupted copies of the infected or otherwise damaged files to be obtained and reloaded on the infected processing devices, should such action becomes necessary.

As another example, remediation techniques may be derived for addressing and responding to malware which as been detected on an infrastructure, enterprise, processing device, etc. Upon identifying a file as malware, the life history of the file may be queried, such as by obtaining at least a portion of the action metadata associated with this suspect file, to determine the extent to which the file has been transmitted throughout the infrastructure. Thus, the pattern of distribution of the malware to the infrastructure can be mapped and a remedy may be targeted only to those processing devices that have received or otherwise store the malware. Moreover, the identification of the origin of the malware file may be precisely determined.

Other alternative, miscellaneous actions may be performed at 82. In one illustrative implementation, the retrieved action metadata corresponds to a transaction history, which can be reviewed to learn details about the history of files and their usage.

Figure 6:
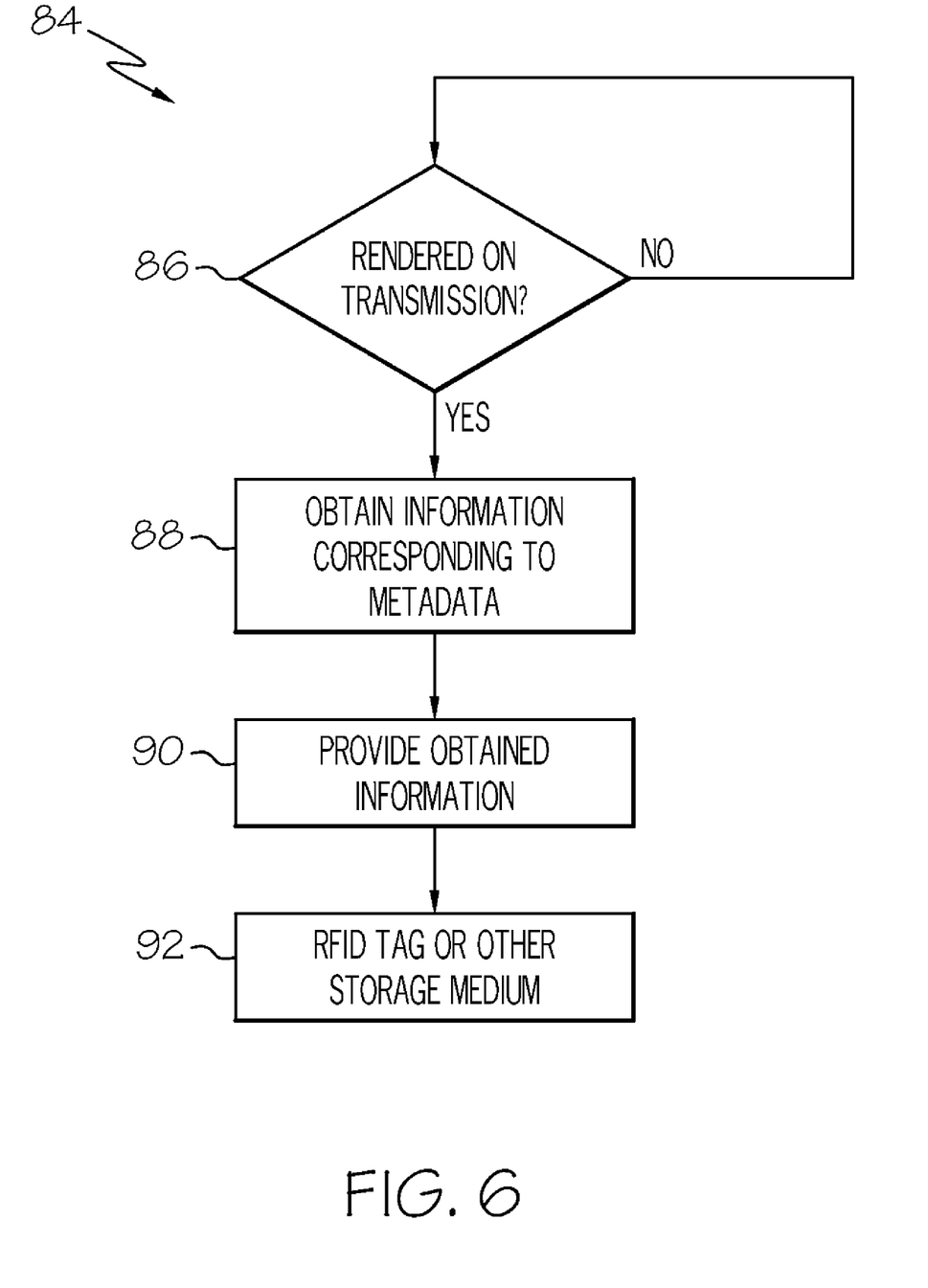
FIG. 6 is a diagram illustrating exemplary approaches for associating action metadata rendered on transmitted objects.

Referring to FIG. 6, a method and system flow 84 is provided for processing action metadata that is associated with the rendering on transmission of a file. A transition is detected at 86, corresponding to the rendering on transmission of a file of interest. Information is obtained at 88 corresponding to the action metadata. The obtained information may comprise, for example, at least a subset of the corresponding action metadata associated with the file, a pointer, link or other reference that identifies action metadata or its corresponding storage location, etc. The obtained information is provided with rendering or transmission at 90. For example, the information may be written to a radio frequency identification (RFID) tag or other storage medium at 92 that is associated with the file.

Figure 7:
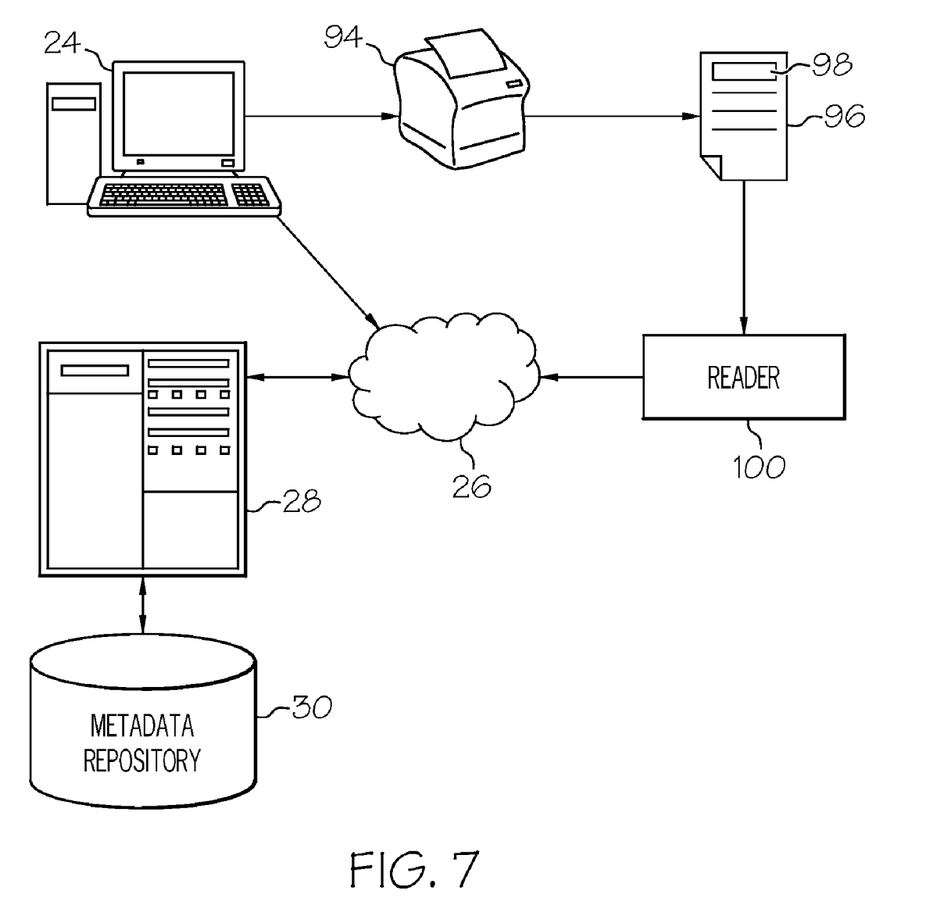
FIG. 7 is a diagram illustrating exemplary approaches for the integration of an object reader to update action metadata based upon detecting the presence of a storage object associated with a rendered file.

Referring to FIG. 7, a processing device 24, such as a personal computer, renders a file, e.g., prints out the file using a printer 94 resulting in a printed hardcopy 96 of the file. The file transition is detected and information 98 associated with action metadata is included with the hardcopy 96. For example, the printer 94 may be configured to encode the information 98 into an RFID tag attached or otherwise integrated into the print substrate that the hardcopy 96 is printed on. If the printer 94 is incapable of writing the information 98, an additional writer may be required. The information 98 may comprise action metadata or a reference to the corresponding action metadata that is stored, for example, in the metadata repository 30 on the server 28. If the hardcopy 96 is brought in proximity to a suitable reader 100, a transition may be recorded to identify the location of the hardcopy 96, which may be communicated, for example, across the network 26 to the server 28 for storage in the metadata repository 30. Thus, a life history of a file can be tracked in hardcopy as well as electronic form across an enterprise.

Thus for example, a person may take the hardcopy 96 to a conference room meeting and scan the document with a suitable reader 100 so that the action metadata is updated for the transition. A processing device may then consult the action metadata repository 30 to verify that the person is an intended recipient and/or has the correct version of the document for the meeting. Moreover, suitable readers 100 may be placed in other appropriate locations to record transitions.

As another illustrative example, a suitable reader may be integrated with a document shredder to record the destruction of the document. When the document is placed in the shredder, the reader records the unique identifier or other action metadata information and updates the action metadata to indicate the destruction of a hardcopy of the document. Thus, the action metadata made be utilized properly to track not only electronic information, but also printed copies and other forms of the files, such as those that have been rendered to tangible objects. Moreover, the destruction of such hardcopies can be tracked as well.

There is a common social practice of dating and versioning documents with the notion of requesting the reader to verify with the author that they have the most recent copy. This is a manual process that relies on the reader to periodically poll the author for updates. However, using action metadata as set out more fully here in, an author can automatically receive notifications of who has the associated documents, whether hardcopy or electronic, whether original copies, or $2^{nd}$ or Nth generation copies, so the author or other responsible source can push out updates, notices and other relevant information when available.

Figure 8:
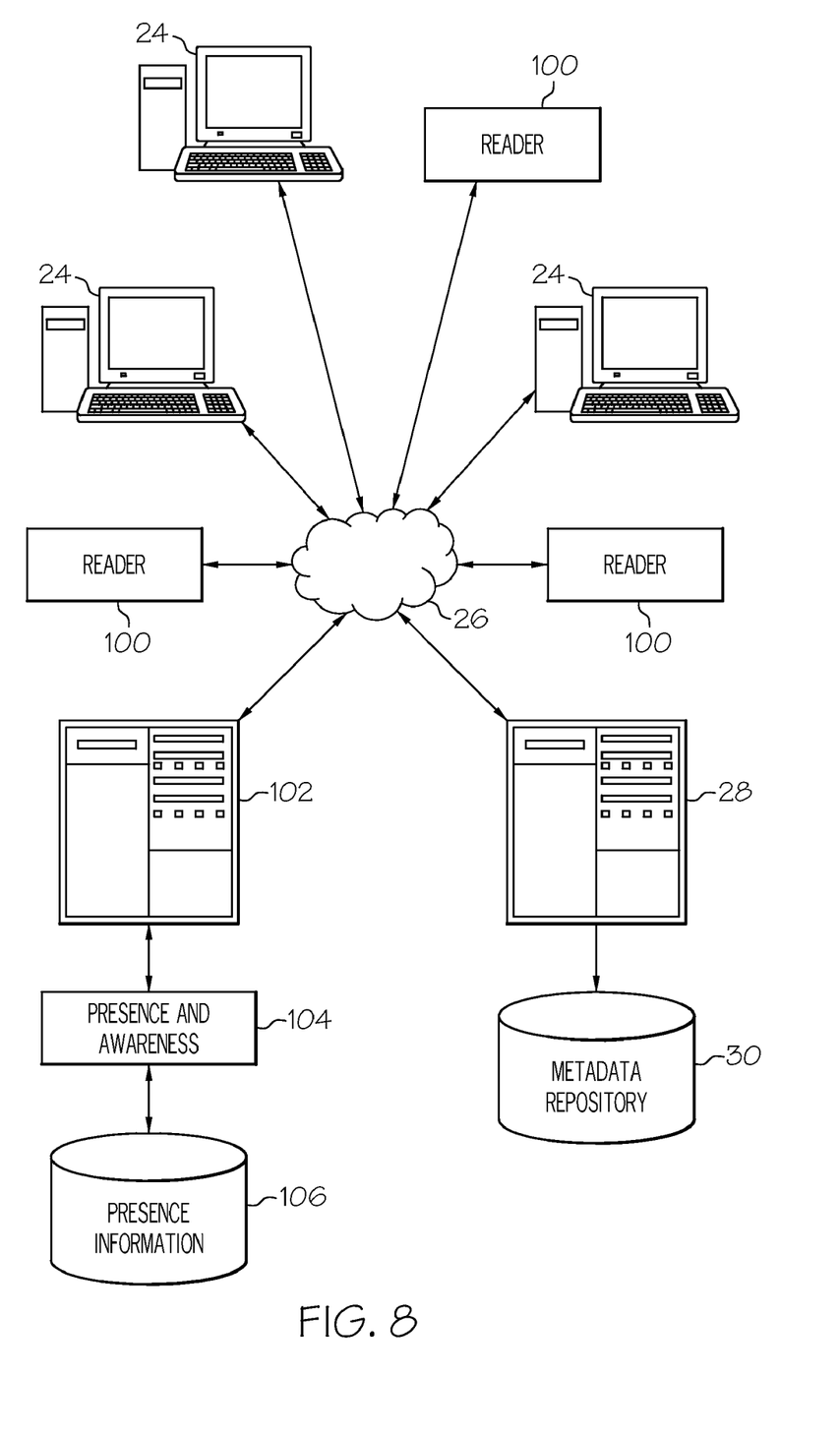
FIG. 8 is a diagram illustrating exemplary approaches for the integration of action metadata into and awareness system.

As yet another illustrative example, collaborative applications, such as instant messaging systems, calendaring programs and other services that provide presence and/or awareness capabilities may be utilized to locate, contact or otherwise indicate whether users are currently online and, when there are online and available, allow instant communications with them. Referring to FIG. 8, a system diagram illustrates that several processing devices 24 and several readers 100 are coupled to the network 26. Also illustrated is a presence server 102 that executes a collaborative application such as a presence awareness system 104 that is in communication with presence awareness data 106. The presence awareness system 104 interacts with users and their corresponding presence awareness data 106 to provide any number of collaborative objectives, such as instant messaging, on-line conferencing, paging, person locating and contacting, etc. This exemplary system allows the integration of presence information in combination with action metadata 40, e.g., as is stored in the metadata repository 30 on the server 28. This enables, for example, a presence service to show users who have copies of a particular file, and allows instant collaboration with them.

The action metadata may thus be integrated with awareness systems such as a presence server system illustrated. This may enable someone online to determine who a document author is, to determine which peers in a group have received copies of a document, and to otherwise link presence awareness and action metadata.

Figure 9:
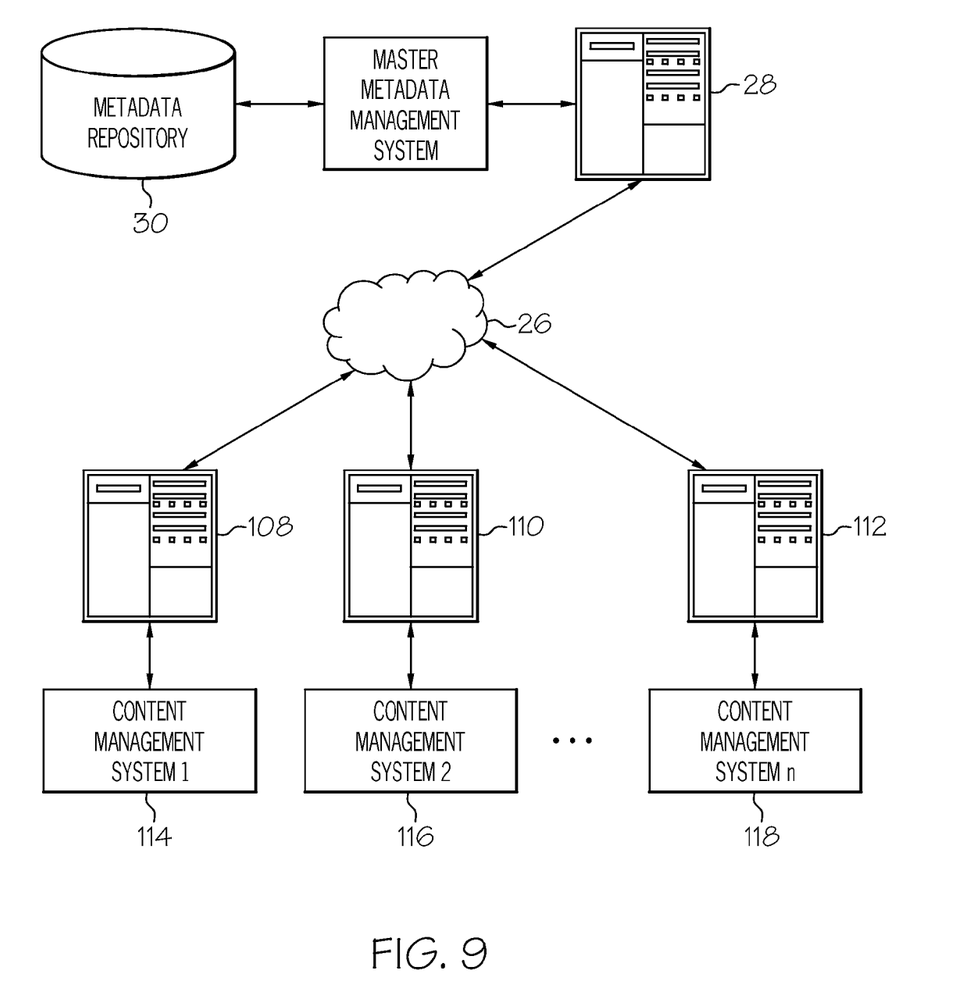
FIG. 9 is a diagram illustrating exemplary approaches for the integration of action metadata across multiple content management systems.

Referring to FIG. 9, the action metadata may also be utilized by other applications. For example, a network system may comprise a plurality of servers 108, 110, 112 that communicate over the network 26. Each of the servers 108, 110, 112 supports at least one content management system 114, 116, 118, respectively. Exemplary content management systems may include an e-mail system, a file system, a website, a digital rights management system, a live communications server, a presence awareness server, or other content management system.

Accordingly, a master metadata management system is realized where file transitions can be tracked across multiple content management systems 114, 116, 118. That is, when a file is created within any of the supported content management systems 114, 116, 118, a notification of the file transition is sent to the master metadata management system, e.g., the server 28, which stores the transition metadata in the metadata repository 30 as described in greater detail herein. When a file is transferred out of any of the supported content management systems 114, 116, 118, a notification of the file transition is sent to the master metadata management system. Correspondingly, when a file is received within any of the supported content management systems 114, 116, 118, a notification of the file transition is sent to the master metadata management system.

Such notifications of file transitions, i.e., the action metadata may comprise, for example, an identifier of the file, who is sending the file or where the file was created and where the file is going if relevant. The files may be known by different identifiers in different content management systems 108, 110, 112 and the action metadata management system implements the capability of matching up different identifiers to the files so that appropriate metadata can be tracked across all content management systems 114, 116, 118.

Notifications to the action metadata management system may be implemented using push and/or pull technologies. The adaptation of a brokering function to obtain the action metadata from each content management system 108, 110, 112 may be implemented by the content management system itself, or the brokering function may be implemented by the action metadata management system, a third party or other source. The adaptation or brokering may be implemented using any of possible mechanisms, including triggering mechanisms within each of the content management systems, the addition of trigger scripts, the insertion of hooks into the content management systems so the trigger may be generated, etc. Still further, an implementation for records associated with the action metadata management system may be standardized and developed so that corresponding content management systems 114, 116, 118 may contain code to execute such standard implementations. Thus, in one illustrative example, each content management system 114, 116, 118 may be instructed to provide notification to the action metadata management system 28 of file transitions.

The use of action metadata 40 to construct a history of corresponding tracked files may be conceptualized along both a time axis and along a breadth axis. For example, copies of a select file and the histories associated with each of the copies of the file may be followed across the enterprise, including transitions recorded by the various processing devices 24, the readers 100, content management systems 114, 116, 118, etc. Thus, a multi-system transition tracking capability may be derived by receiving at least one indication of a file transition and responsive to that indication, creating at least one element of the metadata associated with the transition. Once the metadata is established and stored in a suitably accessible location, e.g., the metadata repository 30, a request for a transition history may be received and processed, such as by aggregating history information associated with at least two instances of a file and providing an indication of the transition history to the requester, where the metadata may be determined from traditionally non-integrated systems.

Additionally, a single system transition tracking method and system may be realized. For example, responsive to receiving a file attached to an e-mail or other tracked source, at least one element of metadata is associated with a file origin. Responsive to further file transitions within the system, at least one element of metadata is associated with each transition corresponding to the files being monitored. Upon receiving a request for action metadata, such as for receiving a request for transition history associated with a file of interest, an indication of transition history can be derived from the action metadata as noted in greater detail herein.

As yet another example, an e-mail server, file server or multiple combinations of servers may track file transitions. For example, an e-mail server may scan incoming and outgoing e-mails and corresponding file attachments. Responsive to receiving the e-mail, the server or a processing module corresponding thereto, determines at least one element of action metadata associated with the detected transition that characterizes the detected transition events.

Further file transitions associated with a tracked file, e.g., an e-mail attachment, may be utilized to update the action metadata by receiving indications of file transitions associated with the tracked file from a single user, or across multiple users, such as may be realized by multiple operators collaborating with a common file or by distributing a common file to multiple processing devices. The multiple users who receive a tracked file may provide location and other appropriate action metadata information, e.g., which may be aggregated to a common action metadata file, such as in the metadata repository 30. Accordingly, files can be tracked as they change states across various content stores in an enterprise. All transitions, e.g., nodes in the flow of a file across the enterprise are equally relevant in contributing to the historical metadata.

As an illustrative example, an e-mail server may scan every incoming and outgoing e-mail message for file attachments. For each file attachment, transition metadata is recorded, including, for example, the name, date and size of the attachment. A cryptographic hash of the attachment, the address of the person sending the attachment, the host address of the server sending the attachment and the addresses of the persons receiving the attachment may also be stored with the action metadata. Given this data, every processing device that receives a given attachment may be determined by selecting from the action metadata, all metadata records that have the given attachment hash value. The first processing device, and correspondingly, the first operator to send the file attachment may be determined by sorting the metadata records having the attachment's hash value by date and/or time.

The span of processing devices that receive a file from a given sender may also be determined for example by performing one or multiple queries on the appropriate action metadata. As an example, a first query may be executed to identify the first-generation recipients of the file of interest. Individual queries may then be implemented to find second-generation and subsequent recipients for each of the first-generation recipients, and so on. The above process may be described generally as a breadth first tree traversal. However, alternate or additional queries and other actions may be implemented against the aggregated action metadata, such as printing reports, viewing metadata history, saving query results to disk, etc.

As noted in greater detail here in, action metadata may be stored in any appropriate format, such as in a log file, relational database, array, linked lists or other with file structure. In order to appropriately store, retrieve, append or otherwise manipulate information stored in a corresponding action metadata, and identifier or other uniquely indicating attribute can be associated with a corresponding action metadata. Accordingly, the life history of action metadata associated with a given file of interest may be queried on the assigned identifier to determine which systems received the file of interest. If an update, malware fix, bug patch or other necessary remediation action is required, and updated file can be transmitted to the systems to which the file has been previously transmitted as identified by the corresponding identifier.

As yet another example, a method of providing a licensing audit trail may be implemented. For example a file may be received from an external source, where the file is subject to licensing constraints. A file identifier may be generated and stored with the metadata associated with the metadata history of that file, e.g., in the metadata repository 30. A licensing authority may then query the master metadata against the file identifier to determine who received the file to verify that the terms of the license constraints are imposed. Accordingly, a tool may be derived to provide an enterprise with an efficient means for providing an audit trail responsive to the history of a licensing authority, thus enhancing the ability of the enterprise to comply and provide compliance with licensing terms and conditions.

The particular manner in which desired action metadata is retrieved and otherwise processed may be determined largely upon the manner in which the data is created and stored. However, any manipulations of the action metadata may be utilized in order to extract relevant and useful information. Additionally, controls may be imposed upon the manner in which the action metadata is retrieved. For example, levels of security may be imposed by the server 28 to limit the manner in which the action metadata is accessed. Accordingly, an author of an e-mail may have access rights to the action metadata so as to be able to identify the location of every instance of a file authored thereby. However, in sending that initial e-mail, some recipients may be blind carbon copied while other recipients may be identified as recipients or carbon copy recipients. Accordingly, a user who has received the e-mail may have access rights to see the locations of instances of the file that were spawned or otherwise linked to a person listed in the "sent to" or "copy" fields of corresponding e-mail messages. However such a user may be restricted from seeing all locations of the instance of the file, e.g., where the location is linked back to a "blind copy". Other suitable control and security features may also be implemented, as the particular application dictates.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system modules or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a module, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method for tracking file transitions comprising:
   identifying the occurrence of file transitions associated with corresponding computer files, wherein said file transitions are of transition types to be tracked and said corresponding computer files are associated with at least one computer processing device;
   generating at least one transition-related element of metadata that characterizes an associated file transition for each identified occurrence of a file transition that is tracked;
   storing generated transition-related elements of metadata;
   receiving by a computer processing device, a request for historical file transition information;
   transforming previously stored metadata into a query response by aggregating transition-related elements of metadata corresponding to at least two instances of a computer file that is associated with said request for historical information; and
   providing responsive to said request, information derived from said aggregated elements of metadata.

2. The method according to claim 1, wherein said identifying said occurrence of file transitions comprises identifying at least one of creating, receiving, transmitting, transforming, rendering and deleting a file.

3. The method according to claim 1, wherein said storing generated transition-related elements of metadata comprises storing each generated element of metadata intrinsic to its corresponding file.

4. The method according to claim 1, wherein said storing generated transition-related elements of metadata comprises storing each generated element of metadata extrinsic to its corresponding file.

5. The method according to claim 1, wherein:
   said identifying said occurrence of file transitions comprises identifying file transitions across at least two different content management systems.

6. The method according to claim 1, wherein:
   said receiving by a computer processing device, a request for historical file transition information comprises receiving a request to identify transitions associated with a file identified as malware;
   said providing responsive to said request, information derived from said aggregated elements of metadata comprises providing information that identifies each processing device that obtained an instance of said malware;
   and further comprising:
   targeting a malware remedy to said each processing device that obtained an instance of said malware.

7. The method according to claim 1, wherein:
   said generating at least one element of metadata that characterizes an associated file transition for each identified occurrence of a file transition that is tracked; comprises associating a file identifier to its corresponding file;
   said providing responsive to said request, information derived from said aggregated elements of metadata comprises providing information identifying at least one processing device that obtained an instance of a file of interest;
   and further comprising:
   updating said file of interest on a select processing device that obtained an instance of said file of interest if an associated file indicator indicates a different version then a desired version of said file of interest.

8. The method according to claim 1, wherein:
   said receiving by a computer processing device, a request for historical file transition information comprises receiving a request for historical transition information associated with a first instance of a file that has been damaged or deleted from a first location;
   said providing responsive to said request, information derived from said aggregated elements of metadata comprises providing information that identifies a second location having a second instance of said file;
   and further comprising:
   providing a copy of said second instance of said file to replace said first instance of said file.

9. The method according to claim 1, further comprising:
   receiving a licensed file from an external source, said licensed file subject to licensing constraints;
   wherein:
   said generating at least one element of metadata that characterizes each identified file transition to be tracked comprises associating a file identifier to its corresponding file; and
   said providing responsive to said request, information derived from said aggregated elements of metadata comprises providing an audit trail to a licensing authority.

10. The method according to claim 1, wherein:
    said identifying the occurrence of file transitions associated with corresponding computer files, wherein said file transitions are of transition types to be tracked comprises identifying rendering a file to hardcopy form;
    further comprising:
    storing on a portable storage device, at least one of an identifier that identifies corresponding metadata associated with said file and at least one element of metadata; and
    associating said portable storage device with said hardcopy form of said file.

11. The method according to claim 10, wherein:
    said storing on a portable storage device, at least one of an identifier that identifies corresponding metadata associated with said file and at least one element of metadata comprises storing said information on a radio frequency identification tag associated with said hardcopy form of said file; and
    further comprising:
    detecting the presence of said radio frequency identification tag; and
    generating at least one element of metadata characterizing the transition of detecting the radio frequency identification tag.

12. A computer program product to track file transitions comprising:
    a computer usable storage medium having computer usable program code embodied therewith, the computer usable program code comprising:
    computer usable program code configured to identify the occurrence of file transitions associated with corresponding computer files, wherein said file transitions are of transition types to be tracked;

computer usable program code configured to generate at least one transition-related element of metadata that characterizes an associated file transition for each identified occurrence of a file transition that is tracked;

computer usable program code configured to store generated transition-related elements of metadata;

computer usable program code configured to receive a request for historical file transition information;

computer usable program code configured to transform previously stored metadata into a query response by aggregating transition-related elements of metadata corresponding to at least two instances of a computer file that is associated with said request for historical information; and computer usable program code configured to provide, responsive to said request, information derived from said aggregated elements of metadata.

13. The computer program product according to claim 12, wherein said computer usable program code configured to identify the occurrence of file transitions associated with corresponding computer files, wherein said file transitions are of transition types to be tracked, identifies at least one of creating, receiving, transmitting, transforming, rendering and deleting a file.

14. The computer program product according to claim 12, wherein said computer usable program code configured to store generated transition-related elements of metadata stores at least one element of metadata intrinsic to its corresponding file.

15. The computer program product according to claim 12, wherein said computer usable program code configured to store generated transition-related elements of metadata stores at least one element of metadata extrinsic to its corresponding file in a metadata repository.

16. The computer program product according to claim 12, wherein: said computer usable program code configured to identify the occurrence of file transitions associated with corresponding computer files, wherein said file transitions are of transition types to be tracked comprises the identification of file transitions across at least two different content management systems.

17. The method according to claim 1, wherein:
said identifying the occurrence of file transitions associated with corresponding computer files, comprises:
identifying the occurrence of file transitions across at least one exposure channel of at least one system, wherein said at least one exposure channel comprises at least one of an email exposure channel or a web-enabled exposure channel.

18. The method according to claim 1, wherein:
said storing generated transition-related elements of metadata comprises storing a unique key and a key of the parent source file of an associated transition if the transition is associated with the creation of multiple instances of the same file; and
said transforming previously stored metadata into a query response by aggregating transition-related elements of metadata comprises aggregating said information based upon said unique key and key of the parent source file to provide a determination of at least one of: the provenance of the origination file, the chain of custody or the transmission trail of the copied instance of the original file.

19. The method according to claim 1, wherein said receiving by a computer processing device, a request for historical file transition information, comprises:
receiving the request via at least one of a programmatic request, data mining application, SQL query, manually input via operator request or implementation as part of autonomous processing.

20. The method according to claim 1, wherein said transforming previously stored metadata into a query response by aggregating transition-related elements of metadata corresponding to at least two instances of a computer file comprises transforming at least one of an entirety of the relevant collected metadata, metadata regarding instances of a particular file, metadata regarding a file type or metadata associated with at least one user.

21. The method according to claim 1, wherein:
said transforming previously stored metadata into a query response by aggregating transition-related elements of metadata and said providing responsive to said request, information derived from said aggregated elements of metadata, further comprises imposing security levels to restrict and limit the manner in which the transition-related elements of metadata are accessed or provided, depending upon predetermining a control scheme.

22. The computer program product according to claim 12, wherein:
said computer usable program code configured to identify the occurrence of file transitions associated with corresponding computer files comprises:
computer usable program code configured to identify the occurrence of file transitions across at least one exposure channel of at least one system, wherein said at least one exposure channel comprises at least one of an email exposure channel or a web-enabled exposure channel.

23. The computer program product according to claim 12, wherein:
said computer usable program code configured to store generated transition-related elements of metadata comprises computer usable program code configured to store a unique key and a key of the parent source file of an associated transition if the transition is associated with the creation of multiple instances of the same file; and
said computer usable program code configured to transform previously stored metadata into a query response by aggregating transition-related elements of metadata comprises computer usable program code configured to aggregate said information based upon said unique key and key of the parent source file to provide a determination of at least one of: the provenance of the origination file, the chain of custody or the transmission trail of the copied instance of the original file.

24. The computer program product according to claim 12, wherein said computer usable program code configured to receive a request for historical file transition information comprises:
computer usable program code configured to receive the request via at least one of a programmatic request, data mining application, SQL query, manually input via operator request or implementation as part of autonomous processing.

25. The computer program product according to claim 12, wherein said computer usable program code configured to transform previously stored metadata into a query response by aggregating transition-related elements of metadata corresponding to at least two instances of a computer file comprises computer usable program code configured to transform at least one of an entirety of the relevant collected metadata, metadata regarding instances of a particular file, metadata regarding a file type or metadata associated with at least one user.

26. The computer program product according to claim 12, wherein:

said computer usable program code configured to transform previously stored metadata into a query response by aggregating transition-related elements of metadata and computer usable program code configured to provide, responsive to said request, information derived from said aggregated elements of metadata, further comprises computer usable program code configured to impose security levels to restrict and limit the manner in which the transition-related elements of metadata are accessed or provided, depending upon predetermining a control scheme.

* * * * *